United States Patent
Chavez et al.

(10) Patent No.: US 10,984,071 B2
(45) Date of Patent: *Apr. 20, 2021

(54) FUNCTION AND MEMORY MAPPING REGISTRY WITH REACTIVE MANAGEMENT EVENTS

(71) Applicant: OMEGA SUNRISE GROUP SPENDTHRIFT TRUST, Eagle Point, OR (US)

(72) Inventors: Joshua Lee Chavez, Eagle Point, OR (US); Mohammad Fried Khan, Eagle Point, OR (US)

(73) Assignee: OMEGA SUNRISE GROUP SPENDTHRIFT TRUST, Eagle Point, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/547,247

(22) Filed: Aug. 21, 2019

(65) Prior Publication Data

US 2019/0377769 A1 Dec. 12, 2019

Related U.S. Application Data

(63) Continuation of application No. 15/595,988, filed on May 16, 2017, now Pat. No. 10,394,926.

(60) Provisional application No. 62/337,823, filed on May 17, 2016.

(51) Int. Cl.
| | |
|---|---|
| *G06F 16/958* | (2019.01) |
| *G06F 16/957* | (2019.01) |
| *H04L 29/08* | (2006.01) |
| *G06F 15/173* | (2006.01) |

(52) U.S. Cl.
CPC ........ *G06F 16/972* (2019.01); *G06F 16/9574* (2019.01); *H04L 67/025* (2013.01); *G06F 15/173* (2013.01); *G06Q 2220/10* (2013.01); *H04L 67/1097* (2013.01); *H04L 67/22* (2013.01)

(58) Field of Classification Search
None
See application file for complete search history.

(56) References Cited

U.S. PATENT DOCUMENTS

| | | |
|---|---|---|
| 2012/0101975 A1 | 10/2012 | Khosravy |
| 2014/0040286 A1 | 2/2014 | Bane et al. |

(Continued)

*Primary Examiner* — Syed A Roni
(74) *Attorney, Agent, or Firm* — Buchalter, A Professional Corp; Sean Casey

(57) ABSTRACT

A system for managing data content and data content relationships through resource efficient process structures for cloud and network environments includes a Clode core. The Clode core creates an object/display/process based on a defined order of processes determined by the object's tags and/or relationships to a function map and/or other objects in the system. This is used in Clode tag modules such as 'clode:autopublish' to create a data publication on the server, by 'clode:autosubscribe' to make client's automatically subscribe to data related to the tagged object, and by 'clode:surface' to manage an object on a display; just to name a few use cases. Tags can then be used to manage third party environments such as a docker container that would be classified as having the tag 'on', but when removed could cause the container to shut off. Tag management functions could also change the classifications as to say in the previous example to cause a tag to be added called 'off'.

20 Claims, 1 Drawing Sheet

(56) References Cited

U.S. PATENT DOCUMENTS

2015/0286731 A1  10/2015  Khosravy
2016/0124722 A1   5/2016  Matthew

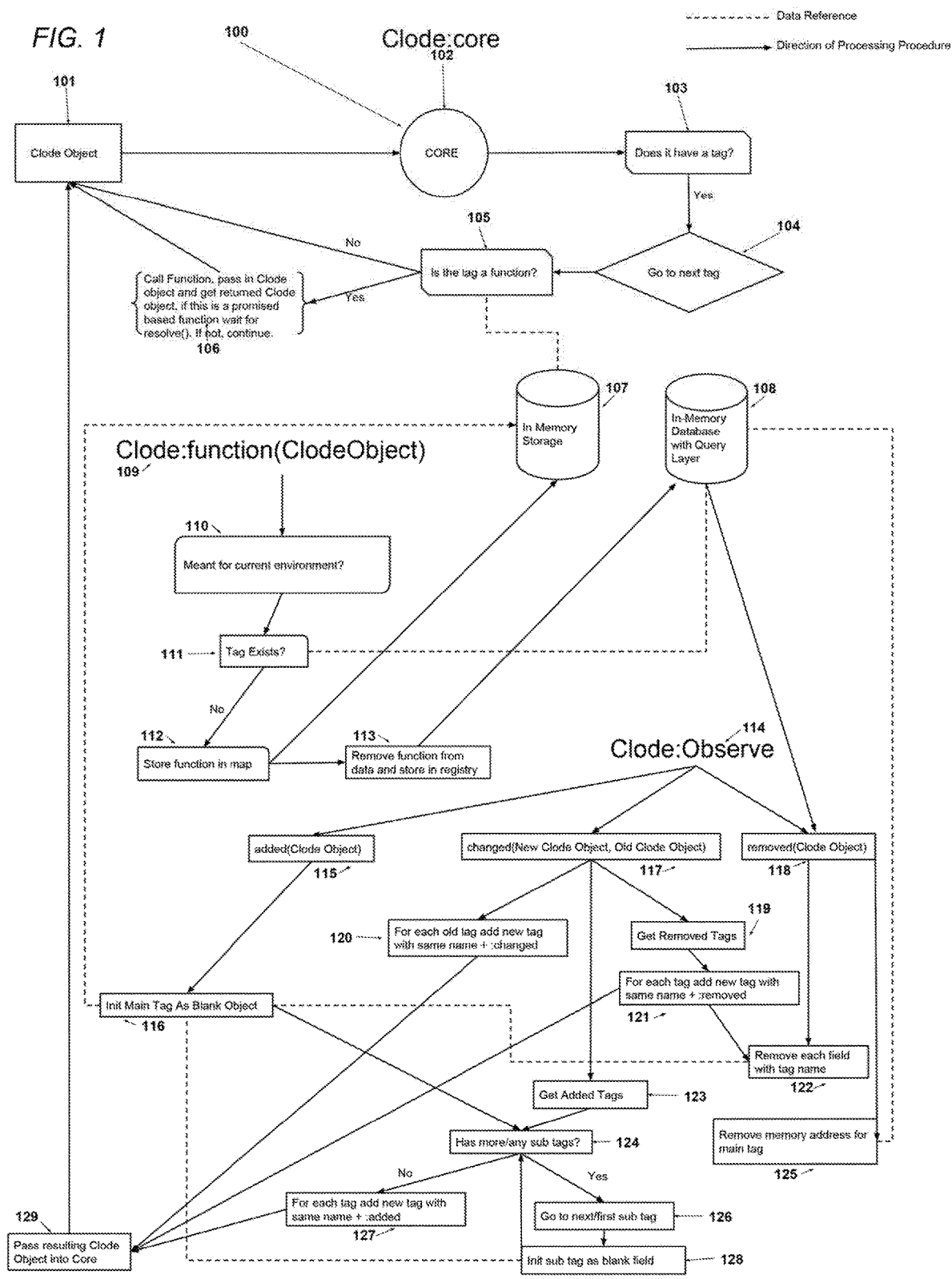

FUNCTION AND MEMORY MAPPING REGISTRY WITH REACTIVE MANAGEMENT EVENTS

CROSS-REFERENCE TO RELATED APPLICATIONS

This application is a continuation of U.S. application Ser. No. 15/595,988, filed May 16, 2017, which claims the benefit of U.S. provisional application No. 62/337,823, filed May 17, 2016 and entitled FUNCTION AND MEMORY MAPPING REGISTRY WITH REACTIVE MANAGEMENT EVENTS, which provisional applications are incorporated by reference herein in their entirety.

FIELD OF THE INVENTION

The present invention is directed to a method of managing data content and data content relationships through resource efficient process structures for cloud and network environments, while bridging the different strengths of programming languages and platforms and allowing them to couple with ease into one system. The present invention is also directed to an apparatus in the way of a digital code contained on a digital memory that performs this method or function.

DESCRIPTION OF THE RELATED ART

Digital computers are well known in the art, and typically comprise one or more digital input/output ("I/O") ports and/or receivers for receiving input signals from but not limited to a keyboard, a virtual keyboard, a touch screen, a mouse pad, "right click" and "left click" mouse inputs, voice-to-text input and processing capabilities, vocal command input and processing capabilities, and infra-red and RF signals such as Bluetooth. Most of the transmission and information processing described herein is therefore to be understood in terms of digital functions performed by a digital computer. Digital protocols for computer I/O include, but are not limited to, IRQ (Interrupt Request) interrupts or other token polling type protocols, token passing, contention (e.g. Ethernet), serial port, parallel port, USB input and output (I/O) capabilities, and the corresponding transmitters and receivers, as appropriate.

A digital computer also has output/transmission capabilities for one or more outputs including, but not limited to, a visual display, an audio display and communication protocols. Moreover, the term "computer" comprehends mobile battery-powered units of any size (e.g. "hand held" devices which were, at one time, limited to cellular telephone functionality, "tablet" devices, and "laptop" computing devices). Because size is fundamentally a spectrum, the distinction between different computing devices is not relevant to the embodiments described herein. The term "computer" further comprehends "desktop" units which are not designed for mobility and may have little or no battery capability. Internet access includes "hard-wire" access and wireless access. Moreover, throughout this disclosure, "Internet" access is not limited to IP (Internet Protocol) messaging. Smart phones using CDMA ("Code Division Multiple Access"), TDMA ("Time Division Multiple Access") and FDMA ("Frequency Division Multiple Access") are often able to access visual "URL pages" which are interactive and resemble, in form and function, an "Internet page." The term "Internet" comprehends the widest possible array of accessible page displays, including, but not limited to, IP, CDMA, TDMA, FDMA, Intra-net, Extranet, and local area networks (LAN) with a functionality resembling traditional Internet functionality.

Many computers also have one or more digital storage devices including RAM, erasable and non-erasable PROMs, rotating media such as hard drives, optical disks and "floppy drives", and solid state memories. Digital storage devices comprehend removable devices such as optical disks and "thumb drives," permanently installed "hard drives" comprised of metal, metal oxide, or any other storage media, and remote storage devices accessed through the Internet or some other channel of transmission. Remote storage and processing locations are often referred to as "the cloud." The term "computer" comprehends all of these functions and apparatuses, and further comprehends a device having one or more microprocessors with digital processing capability, an operating system, and one or more "applications," as well as devices which distribute tasks to the "cloud" or remote processing.

As used herein, the term "application" describes a digital program comprised of digital code. An application runs on a computer and can be stored in digital storage media of a computer, or alternatively, stored remotely in the "cloud." Typically, the term "application" refers to a computer program capable of performing a wide variety of digital processing functions that are highly integrated in a common program. For example, spell checking, highlighting, italicizing or underscoring text, cutting and pasting text, and altering margins are distinct digital functions, but are deemed related to "word processing." These diverse digital functions are therefore typically part of a single word processing "application." A "module" is also a digital program integrated with an application. The distinction between an application and a module is largely one of consumer expectation, rather than any "bright line" distinction in information processing. For example, consumers will not pay extra for the ability to underline a word in a word processing system, but might be willing to pay extra for the ability to type or edit Chinese or Arabic on a system normally accustomed to the Latin alphabet. A programmable feature to underline a word in a digital paragraph, typically, would not therefore be considered a "module," but an integral part of the application. At one time, functionality to type in non-Latin alphabets was an "add on module." Increasingly, foreign alphabets are considered part of an application due to consumer expectation, whereas, at this time, spell checkers in foreign languages are, in some instances, "add-ons" that cost extra, and may therefore be considered a "module." A "schema" is a defining structure of an object, such as start and end dates being required fields for an event.

A "suite" typically comprises a collection of applications which are conceptually distinct. For example, a word processing program such as Microsoft Word is commonly known as an "application." An integrated collection of Microsoft products, such as Word (word processing), "Outlook" (e-mail) and Excel (spread sheet) may comprise a "suite."

An application typically appears in a single "window" (computer display), with icons and components pre-arranged on the screen layout, or a "menu" of an application which gives the appearance that alternative "windows" are accessed through the "same" application, whereas a "suite" typically requires opening separate "windows" to run or view distinct applications that are part of the suite.

Ultimately, however, there is no bright line between a module, an application, and a suite. The distinction is, in large part, one of cost and consumer expectation. The use of the terms "application", "module", "suite" and "schema" herein are therefore employed exclusively to best describe the invention in terms that will enable the reader to make and use the same, and are not intended to limit the embodiments described herein, which comprehend the widest scope of these terms.

Today's Network and Web Technologies represent a sophisticated way of delivering data content for everyday use in every industry. As microprocessors have increased in speed, however, programmers have often grown lax. Programs are increasingly long and complex. Programming languages and strategies have therefore grown resistant to concepts of efficiency or standardization. Converting tools are typically necessary to overcome the hurdles of synchronizing data content sets to guarantee fast flowing working processes for and with different platforms. Cloud technologies are providing the necessary means for web and network technologies to deal with "Big Data" and are creating an outlook of the future process structures.

One of the most vexing issues confronting modern cloud computing, however, is the organization and classification of data sets. For example, commands for performing a software task (and data sets and structures supporting that command) are not uniform. As a consequence, in cloud computing applications, repetitive data commands—and repetitive supporting data—are repeatedly transmitted to the cloud, with ever increasing bandwidth consumption, storage consumption and processing demands.

Data structures are currently classified by supplying a schema to a separated data table. Consider the example wherein a table of events is utilized to display a calendar. On a query command for birthday events, the system would search the data table and return the results of only birthday events. The query generates a subset of the calendar data derived from a greater dataset, which is the calendar. A sequence of commands (in the present example, queries) however requires the system to transmit repeated queries to identify birthday events. Moreover, it must extend the schema to provide a field that flags birthday events.

In an embodiment of the proposed invention, a mathematical function is generated that encompasses various possible subsets of data within the calendar. It is a data map of sorts, but it is constantly changing based on classifications, and the system of the invention is designed to be reactive to any data changes at any level.

Subsequent to the display of the referenced calendar data, additional data (also defined by a date) can be integrated in the display according to the calendar data. In some embodiments, the schema of calendar events may include file references. For example, a first data set which may be organized accordingly to date the calendar may comprise birthdays. In the same calendar, however, an attorney may utilize date-stamps as part of the identifier (e.g. digital file name, date of file creation, etc.), to name every piece of evidence in a case. Additionally, each piece of evidence may be identified by "meta data" that includes the date the file was created. These data may be summoned by a single command and integrated with other data arranged by the calendar. In traditional "hard coding" environments, this would require a programmer's anticipation of a user arranging data according to a date embedded in a file name or a date on which the file was created. Only then could the query check inquire as to whether the necessary fields existed.

In another embodiment of the proposed system, two data set names or 'table/collection names', as well as the time at which data changes are made to the names, are hard coded again so that the data goes into the correct places and data identifiers do not overlap or get mixed up.

In some embodiments, an events data table which includes first, second and so on . . . events in a chain may be created. Consider the example of using a calendar to organize birthdays and jpeg files of evidence, both of which are identified by date. This may be carried out by performing XYZ information processing, e.g.:

i) Designating a file folder on the user's C-drive;
ii) searching the meta data of all jpeg files in the file folder for dates;
iii) writing the respective dates into the "date-field" in the CLODE temporary database, wherein the database includes a field for storing an address on the user's computer at which the file is located; and
iv) organizing the date-fields chronologically, wherein the CLODE temporary database intermingles birthday dates and evidence files.

This technique would make the schema of each table always conform to the information each would provide to another system but would also accomplish much processing, as every location for what is needed would need to be searched and the requirements of some schemas would need constant expansion. This technique may also require that an event be made every time a file is created.

Another issue with this technique is that in removal of an event, every hard-coded location would need to be searched to find file references to delete if needed, and vise-versa. Accordingly, it is proposed that every unique set of data be in or appear to be in the same data set, which by default has the same name and requires that every object in its system have a separate process that handles organization and classification. This makes retrieving data much faster as the system knows exactly where the objects are which it needs for a specific use case. Additionally, removal of an object can remove all or part of the classification and data in an object all at once.

This makes data management both fact-based and efficient. Consider an example wherein a user wants to delete a jpeg file from the CLODE application (the database in the user's computer that transfers data to the cloud). The proposed application system would know what data meets which classifications, and if an object is classified and does not meet the classification in question, then processes could be put in place to make the object meet the classification. For instance, the system could create a file, classify it as a file, and classify it as an event. This would make the system provide a file upload field as well as a date picker. The data would be generic to be used in any process where these classifications would be needed. Further, classifications can imply security protocols which can identify groups that the object belongs to using new terms or existing terms. For instance, an event could be classified as a 'business meeting', in which case only people that could access that event would edit/view/update it or, as stated, use existing classifications. In that case, only certain people could classify something as a file and upload it.

BRIEF SUMMARY OF THE INVENTION

Illustrative embodiments of the disclosure are generally directed to a function and memory mapping registry with reactive management events for managing data content and data content relationships through resource efficient process structures for cloud and network environments, while bridging the different strengths of programming languages and platforms and allowing them to couple with ease into one system. The function and memory mapping registry described herein includes an application which is described as a Clode core and is designed to classify and compare data to leverage relationships and differences of classifications, or tags, that extend into reactive functionality and interfaces of programs and applications used to control data flow in a manner that is transparent to the user and consumes minimal CPU bandwidth, thereby creating a simpler and more efficient programming, development and system communication experience, particularly when it is critical that information be up-to-date in real-time across multiple remote systems, i.e. public/private cloud data/processing.

BRIEF DESCRIPTION OF THE DRAWINGS

Illustrative embodiments of the disclosure will now be described, by way of example, with reference to the accompanying drawings, in which:

FIG. 1 is a functional block diagram which illustrates an illustrative embodiment of the function and memory mapping registry with reactive management events of the present disclosure.

LISTING OF REFERENCE NUMERALS

101 Clode Object. A cloud-node object or "Clode object" is a set of data in JavaScript Object Notation ("JSON") format that has a list of tags and a unique identifier across the entire system. This identifier is optionally calculated based on the classification of the information within it. The tags are used to extrapolate relationships, classifications, processes, and security implications.
102 Clode CORE
103 Does it have a tag? (Tag Check Component)
104 Go to next tag (Tag Passing Component)
105 Is the tag a function? (Tag inspection component)
106 Call Function, pass in Clode object and get returned Clode object (Call Function Component)
107 In-memory Storage (In-memory Storage)
108 In-Memory Database with Query Layer (Registry)
109 Clode:function (ClodeObject) (clode:function)
110 Meant for current environment? (Environmental Check Component)
111 Tag Exists? (Tag Query Component)
112 Store function in map (Tag Storage Component)
113 Remove function from data and store in registry (Remove Component)
114 Clode:Observe (Clode:observe component)
115 added(Clode Object) (Added Object Component)
116 Init Main Tag As Blank Object (Tag as Blank Object Component)
117 changed(New Clode Object, Old Clode Object) (Changed Object Component)
118 removed(Clode Object) (Removed Clode Object Component)
119 Get Removed Tags (Removed Tag Component)
120 For each old tag add new tag with same name+:changed (Changed Add Tag Component)
121 For each tag add new tag with same name+:removed (Remove Add Tag Component)
122 Remove each field with tag name (Field Remove Component)
123 Get Added Tags (Get Added Tag Component)
124 Has more/any sub tags? (Tag Values Determining Component)
125 Remove memory address for main tag (Memory Address Remove Component)
126 Go to next/first sub tag (Next Unused Tag Component)
127 For each tag add new tag with same name+:added (Tag Add Component)
128 Init sub tag as blank field (Field Add Component)
129 Pass resulting Clode Object into Core (Object Pass Component)

DETAILED DESCRIPTION

In the following description and example, many specific details are provided to understand various embodiments of the invention. Those skilled in the art will readily appreciate that the invention may, however, be practiced without implementation of many of the specific details. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description. As used herein, the term "component" includes but is not limited to any and all combinations of hardware, software, platform, system, element, process, method, procedure or series of steps which is capable of implementing, executing, accomplishing or otherwise carrying out the recited function or functions.

According to an illustrative embodiment of the function and memory mapping registry with reactive management events of the present disclosure, a Clode object may include any number of fields with the exception of a unique identifier, and optionally, tags. A Clode core may include a digital application that edits data for streamlined transmission to and from cloud applications. The Clode core may include a file of executable commands and a data library. The data library may include data such as data files and data file folders, for example and without limitation, which may be created by a user or automatically through operation of the Clode core. In some applications, the data files may be fragmented across numerous non-sequential addresses in the Clode core, with appropriate forwarding addresses for following each fragmented data file. Using, for example and without limitation, a JPEG file, in a first step, an object (e.g., the JPEG file, or its associated metadata file) may be stored in the Clode core as a downloaded data file.

In a second step, the tags of the downloaded data file in the Clode core may be inspected. Inspection may progress through the respective tags in the data file. A determination may be made as to whether each tag is a function. If inspection of the tag reveals that the file format (e.g. JPEG, PDF, etc) of the new downloaded data file matches as a function in the system registry (i.e., there is a mechanism to open and utilize the file), then the downloaded data file may be assigned an entire object (fields, tags and identifier) to be interpreted and/or modified and returned. The most basic example would be the pre-registered function 'clode:function', the purpose of which is just to acquire functions from an object with a 'clodefunction' field name and register the functions into the system. This would typically be done inside source code from a module and not a database, although the latter is possible. Practical use of this would be to pass in an object that has the tag 'clodefunction', a tag field equaling 'reminder:added'. This registers the function as 'reminder:added' which is used during the inspection by the Clode core of new or existing objects tagged with 'reminder' one time; including when an existing object gains the tag 'reminder'. The purpose of the function could be to show a dialog of the reminder. This step does not need to be repeated as it's now considered a registered module.

Next, in providing a reminder to the system, an object may be created inside of the Clode data collection 'clode.social' (a database source). Tags of unique user IDs may be provided that should see the message, the tag 'reminder', and a body field with the text of the message. Because objects can be passed into Clode core in many different ways, interpreting an object in the data store is not automatic by default. It may be necessary to tag the object with 'clode:observe' which implies that this is an object that has functionality that manages it. As soon as the object appears in the database, it may be first determined whether a client is subscribed to a tag name that implies the publication of a subset of tags called a 'clode:autopublish' (this is for performance to negate overloading the server with unique data set calculations). This object may have just two tags 'clode:autopublish' and 'reminder'. The object may also have the tag field 'all-reminders' which would be used as the reference to the subscription name.

Next, the client may subscribe to the tag 'all-reminders'. This action may cause a module called 'clode:security' to check the tags against known groups to see if they exist and if they will permit the user to view (in this case) the object. In the event that a client is explicitly denied view access to any of the security groups/tags, the denial may be overridden. In the non-limiting example under consideration, the client may be permitted to view the object because it has the unique ID of the client tagged. If this all passes evaluation, then the object may be sent to the client. When the object appears on the system, Clode core may automatically evaluate the object due to the presence of the 'clode:observe' tag on the object. During its first time processing, when Clode core finds the 'reminder' tag and sees the mapped 'reminder:added' function, it may call this and the reminder may be shown on the screen. To prevent a client from seeing the same reminder every time, the interface for the dialog may simply remove the client's unique identifier from the tags field. This may deny the client permission to see the object. Consequently, the client's copy of the object may be deleted from memory and may never again imply view permissions again. This function may also monitored by 'clode:security' on the server to determine if this is allowed by a client, including if other changes were made and if those changes are allowed, such as, for example, to change the text of the reminder itself. Every single one of these processes of data access, modification, and creation and function registration may occur in any order, in which case the result would be the same. The content of the dialogs may be changed after they appear on the screen, in which case the changes may be reflected on every connected client real-time.

The system of the invention may include several data collections that serve a specific purpose. Clode.ninja may be used as an optional listening socket with optional security which bypasses memory and databases. Clode.social may be used as a shared collection of data between client and server that connects to a database, and optionally checks security measures. Clode.io may be used as a server and client individually-localized memory registry that stores values to be reacted to and allows transformation of objects, without high database load and network traffic. Clode.memory may be used as a server and client individually localized memory object that holds larger objects that are to be used and referenced during a reactive function.

Each collection may have a relationship with other collections in how it receives or sends data changes from another collection. Clode.ninja may transform objects in Clode.io across multiple clients. Clode.social objects, if defined as a locally-transformable object, may mirror themselves into Clode.io to await save states; otherwise, they may provide arbitrary data to template contexts. Clode.io objects, if published, may save data to Clode.social; otherwise, they may stay in-memory. Clode.io objects, when created, may also create a space in Clode.memory in the context of each active functionality tag as a field. Clode.memory may be washed when a tag is removed and wiped when the entire object is removed.

The system of the invention may use tags and relationships to refactor and compare information with itself and other collected data using the following processes to unpack relevant results. A result of matching functionality-mapped relationships as method names may result in Method-Name-Documentation and Functionality-Relationships. Comparing a result of merging optionally registered requirement schemas and/or extended variables of other objects within the context of a relationship to known defaults, options, and requirements for Method-Options-Documentation, Incomplete/Invalid/Completed Objects and Generated Interfaces to Complete Objects. For example, adding a custom field in the context of a tag to an existing or new object that could reactively be a new requirement for existing and future objects, as well as produce documentation for it, a form field with validation, while allowing a limiting view to only observe objects that meet data requirements.

Referring to FIG. 1, in system 100 a Clode Object 101 may be a JSON object with a tag and tags field containing a list of tags, for example: {"tag":"mytag:added","tags": ["clode:function"]}.

A Clode core 102 is the primary function in the native language that takes a Clode object 101.

A tag check component 103 may check the tag field of a Clode object 101 to determine whether there is a remaining tag that has not been processed.

A tag passing component 104 may take the current tag in process from the tags field and pass the tag into the next process.

A tag inspection component 105 may check an in-memory storage 107 to determine if the current tag in process is a mapped function.

A call function component 106 may call the function and pass in a Clode object 101, then get the returned Clode object 101.

An in-memory storage 107 may store functions and large objects that would not need its objects queried but is used directly by other processes.

An in-memory database with a query layer or registry 108 may store relational data to be mapped to memory locations, registered functions, and locally branched database objects.

A pre-registered function "clode:function" 109 may take a Clode object 101 that has the tag "clode:function" in the tags field.

An environment check component 110 may check the tags field of a Clode object 101 for "clode:server" and/or "clode:client" and then check the current environment to determine if the command is running in the right location (client, server, or both).

A tag query component 111 may query the registry 108 to determine whether the tag field in a Clode object 101 has been used to register a tag of the same name already.

A tag storage component 112 may store the function value of the field "clode:function" from a Clode object 101 into the in-memory storage 107 using the tag field as the key.

A remove component 113 may delete the "clode:function" field from the Clode object 101 and store remaining data in the registry 108.

A Clode:Observe component 114 may react to behaviors of a Clode object 101 tagged with "clode:observe" in the registry 108.

An added object component 115 may react to a Clode object 101 having been added to the registry 108.

A tag as blank object component 116 may create a memory address in the in-memory storage 107 with the key equal to the tag field of a Clode object 101.

A changed object component 117 may react when the field of a Clode object 101 has changed in the registry 108.

A removed Clode object component 118 may be a function that is spawned when a Clode object 101 is removed from the registry 108.

A removed tag component 119 is a data observation method to determine which tags in the tags field of a Clode object 101 have been removed.

A changed add tag component 120 may add tags to the tags field of a Clode object 101, a copy of each existing tag with the added text ":changed" at the end to later be processed by Clode core 102.

A removed add tag component 121 may add tags to the tags field of a Clode object 101, a copy of each existing tag with the added text ":removed" at the end to later be processed by Clode core 102.

A tag name remove component 122 may delete the field inside of the memory address created by tag as blank object function 116 inside of the in-memory storage 107 with keys equal to each of the tags in a Clode object 101.

A get added tags component 123 may be a data observation method of a Clode object 101 that determines which tags in a tags field have been added.

A tag values determining component 124 may determine if there is any remaining values of a Clode object 101 tags field that has not yet been processed.

A memory delete component 125 may delete all memory at the location created in-memory storage 107 equal to the key used in the tag as blank object component 116.

A next/unused tag component 126 may use the next or first unused tag in a Clode object 101 tags field as the current tag in process.

A tag add component 127 may add tags to the tags field of a Clode object 101, a copy of each existing tag with the added text ":added" at the end to be later processed by the Clode core 102.

A field add component 128 may add a field in-memory created by the blank object component 116 inside of the in-memory storage 107 equal to the tag in process from the next/unused tag component 126.

An object pass component 129 may take resulting Clode Object 101 and pass it into Clode core 102 for processing.

Many conventional applications today may require a user to go through a re-initialization process to update workflows. Commonly-known examples of re-initialization include reloading a web page, opening and closing an application or pressing a refresh button. Without perpetual and ongoing re-initialization, the user may never be certain whether or not a page display is truly up-to-date. This uncertainty can affect activities as trivial as updates for a local football game or more serious, time-sensitive matters such as data entry, authorizing money transfer, or selecting the "entrance point" in online trading and arbitrage.

These dangers may be mitigated by defining management processes and observation methods based on relational information. Relational information is even more compact than defining additional fields for knowing the state of a context.

For instance, a user may see a field called "running", and it would be equal to a true-or-false-based format on the system. The system 100 of the present disclosure may have a tag called "running" that would only exist in the event that the system were actually running; if the system were not running, it could be tagged with "running", in which case the system would know what to do to achieve a running state. The same is for removing it, the system would no longer be running after actions were taken.

Security

By defining a user's access levels to a tag, that information may be published to a client and used to display administration interfaces if available to those tagged content templates. This may happen reactively as soon as it's assigned, instead of refreshing a page, which is a costly action. By allowing view level access, such as to content with a specific tag, the user's page is updated automatically with the new content that they're allowed to see within the scope of that tag. This makes it so information can not only be related but also imply security protocols.

Modules to Create or Intercept a Process

By creating a functional tag using Clode core, that functionality can be known to the whole system and can interpret/create/remove information within content, spawn processes in reaction to available data and imply security protocols on those functions all with just one tag, all at the same time or individually with additional tags. For instance, creating a calendar event could be tagged with calendar and event. If the event were also tagged with reminder, the system would know the information required for the event and could use it to send a reminder or create an alert when such a piece of content exists. The system could then un-tag itself to prevent further reminders, or it could check for an additional tag called sent. The client could also use this information to show a calendar of only events that have reminders attached. Most conventional systems today do not allow for such granular control.

Interface Display

One of the limitations of schemas in conventional systems is that they must be defined for a single set of objects that are observed. Additionally, the same schemas cannot be reused when a user searches for content in a database to pass to an interface unless it's for form submission validation.

The Clode interface of the present disclosure allows a user to create interfaces that make use of a schema defined by a single tag. Because the user can use multiple tags inside content, the user could then define that the object meets the requirements of multiple schemas. For instance, tagging an object with surface would tell the surface observer that it needs to display this item to the screen and therefore conforms to the surface schema by providing the correct details for its positioning and display patterns. In the same content, it could also be tagged with calendar turning that displays into a calendar but also makes the context of this information available to other things using that tag such as a calendar selection box where it's expecting data to conform to the calendar schema where it would have a title.

This would also work for content creation and verification such as the systems in use today. A user could create a new object, tag it with calendar-item and also tag it with article so both schemas are merged into an auto generated interface which requires both contexts. For example, the calendar-item tag would require a date of the event, and both would make use of each-other's body and title attributes.

Service Management

As in a previous example, a user can turn services on or off by tagging or untagging states, such as by using the tag called running. A user who tries to perform the tagging modification would need to have privileges in the context of the tag running as checked by the security system of the present system, which would then allow the user to turn the service on or off. Creating services could be as simple as inserting a new object into a database which outlines the service, but may also require that the object be tagged with a tag such as service that would be used not only to observe and spawn the service but also to challenge security measures for spawning permissions for that user. For instance, it's like telling an existing service that it doesn't exist and it will conform to the commands of a user by becoming non-existent. Thus, the user can easily give granular or generalized commands, however he or she sees fit, by querying the system and changing states, such as: all running systems the user has stopped, all running systems the user is restarting, all FTP services are stopped, or even all services at a version are a different version now.

While the illustrative embodiments of the disclosure have been described above, it will be recognized and understood that various modifications can be made in the disclosure and the appended claims are intended to cover all such modifications which may fall within the spirit and scope of the disclosure.

What is claimed is:

1. A system for managing data content and data content relationships through resource efficient process structures for cloud and network environments, comprising:
   a Clode object including a JavaScript Object Notation (JSON) object having at least one data file with a list of tags;
   a Clode core, the Clode core being a primary function in a native language that takes the Clode object;
   an in-memory storage, the in-memory storage stores functions and large objects;
   a tag inspection component, the tag inspection component inspects the list of tags of the at least one data file in the Clode core and determines whether each tag in the list of tags matches as a function in the in-memory storage;
   a call function component, the call function component calls the function, assigns an entire object including fields, tags and identifiers to be interpreted and/or modified to each tag in the list of tags determined to be a function and passes the object in the Clode object;
   a Clode:function, the Clode:function takes the Clode object having a tag "clode:function" in the tag field; and
   an environmental check component that checks the tag field of the Clode object for a tag having "clode:server" and/or "clode:client" and checks a current environment to determine if a command is running in a right location (client, server, or both).

2. The system of claim 1, further comprising:
   a tag check component, the tag check component checks a tag field of the Clode object to determine whether there is a remaining tag that has not been processed.

3. The system of claim 2, further comprising:
   a tag passing component, the tag passing component takes a current tag in process from the tag check component and passes the current tag in process to the tag inspection component.

4. The system of claim 1, further comprising:
   an in-memory database with query layer or registry and a tag query component, the tag query component queries the registry to determine whether the tag field in the Clode object was previously used to register a tag of the same name.

5. The system of claim 4, further comprising:
   a tag storage component, the tag storage component stores a function value of a field "clode:function" from the Clode object into the in-memory storage using the tag field as a key.

6. The system of claim 5, further comprising:
   a remove function component, the remove function component deletes a "clode:function" field from the Clode object and stores remaining data in the registry.

7. The system of claim 4, further comprising:
   a clode:observe component, the clode:observe component reacts to behaviors of the Clode object having a tag "clode:observe" in the registry.

8. A system for managing data content and data content relationships through resource efficient process structures for cloud and network environments, comprising:
   a Clode object including a JavaScript Object Notation (JSON) object having at least one data file with a list of tags;
   a Clode core, the Clode core being a primary function in a native language that takes the Clode object;
   an in-memory storage, the in-memory storage stores functions and large objects;
   a tag inspection component, the tag inspection component inspects the list of tags of the at least one data file in the Clode core and determines whether each tag in the list of tags matches as a function in the in-memory storage;
   a call function component, the call function component calls the function, assigns an entire object including fields, tags and identifiers to be interpreted and/or modified to each tag in the list of tags determined to be a function and passes the object in the Clode object;
   a tag check component, the tag check component checks a tag field of the Clode object to determine whether there is a remaining tag that hasn't been processed;
   a tag passing component, the tag passing component takes a current tag in process from the tag check component and passes the current tag in process to the tag inspection component;
   a Clode:function, the Clode:function takes the Clode object having a tag "clode:function" in the tag field;
   an environmental check component, the environmental check component checks the tag field of the Clode object for a tag having "clode:server" and/or "clode:client" and checks a current environment to determine if a command is running in a right location (client, server, or both); and
   an in-memory database with at least one of a query layer and a registry, and a tag query component, the tag query component queries one of the query or registry to determine whether the tag field in the Clode object was previously used to register a tag of the same name.

9. The system of claim 8, further comprising:
   an added object component, the added object component reacts to the Clode object having been added to the registry.

10. The system of claim 9, further comprising:
a tag as blank object component, the tag as blank object component creates a memory address in the in-memory storage with a key equal to the tag field of the Clode object.

11. The system of claim 8, further comprising:
a field remove component, the field remove component deletes a field inside of a memory address created by the tag as blank object component.

12. The system of claim 8, further comprising:
a next unused tag component, the next unused tag component uses a next or first unused tag in the Clode object tag field as a current tag in process.

13. The system of claim 12, further comprising:
a field add component, the field add component adds a field in memory created by the tag as blank object component inside the in-memory storage equal to the tag in process from the next unused tag component.

14. The system of claim 8, further comprising:
a removed Clode object component, the removed Clode object component comprising a function that is spawned when the Clode object is removed from the registry.

15. The system of claim 14, further comprising:
a memory address remove component, the memory address remove component deletes all memory at a location created in the in-memory storage equal to the key used in the tag as blank object component.

16. A system for managing data content and data content relationships through resource efficient process structures for cloud and network environments, comprising:
a Clode object including a JavaScript Object Notation (JSON) object having at least one data file with a list of tags;
a Clode core, the Clode core being a primary function in a native language that takes the Clode object;
an in-memory storage, the in-memory storage stores functions and large objects;
a tag inspection component, the tag inspection component inspects the list of tags of the at least one data file in the Clode core and determines whether each tag in the list of tags matches as a function in the in-memory storage;
a call function component, the call function component calls the function, assigns an entire object including fields, tags and identifiers to be interpreted and/or modified to each tag in the list of tags determined to be a function and passes the object in the Clode object;
a tag check component, the tag check component checks a tag field of the Clode object to determine whether there is a remaining tag that hasn't been processed;
a tag passing component, the tag passing component takes a current tag in process from the tag check component and passes the current tag in process to the tag inspection component;
a Clode:function, the Clode:function takes the Clode object having a tag "clode:function: in the tag field;
an environmental check component, which checks the tag field of the Clode object for a tag having "clode:server" and/or "clode:client" and checks a current environment to determine if a command is running in a right location (client, server, or both);
an in-memory database with query layer or registry and a tag query component, the tag query component queries the registry to determine whether the tag field in the Clode object was previously used to register a tag of the same name; and
a tag storage component, the tag storage component stores a function value of a field "clode:function" from the Clode object into the in-memory storage using the tag field as a key key.

17. The system of claim 16, further comprising:
a clode:observe component, the clode:observe component reacts to behaviors of the Clode object having a tag "clode:observe" in the registry.

18. The system of claim 16, further comprising:
a changed object component, the changed object component reacts when the Clode obiect's fields have changed in the registry.

19. The system of claim 16, further comprising:
a changed add tag component, the changed add tag component adds tags to the tag field of the Clode object, a copy of each existing tag with the added text ":changed" at the end to later be processed by the Clode core.

20. The system of claim 16, further comprising:
a memory address remove component, the memory address remove component deletes all memory at a location created in the in-memory storage equal to a key used in the tag.

* * * * *